United States Patent [19]
Simmons et al.

[11] Patent Number: 5,356,158
[45] Date of Patent: Oct. 18, 1994

[54] RESILIENT ROTARY SEAL WITH PROJECTING EDGE

[75] Inventors: Brian Simmons, San Ramon; Michael S. Rivkin, San Leandro; Arnold Kholodenko, San Francisco, all of Calif.

[73] Assignee: Rotoflex, Inc., Pleasanton, Calif.

[21] Appl. No.: 985,082

[22] Filed: Dec. 2, 1992

Related U.S. Application Data

[63] Continuation-in-part of Ser. No. 973,108, Nov. 6, 1992, Ser. No. 875,889, Apr. 29, 1992, abandoned, Ser. No. 868,080, Apr. 13, 1992, abandoned, Ser. No. 735,920, Jul. 25, 1991, abandoned, and Ser. No. 738,007, Jul. 30, 1991, abandoned, said Ser. No. 735,920, and Ser. No. 738,007, each is a continuation-in-part of Ser. No. 595,420, Oct. 11, 1990, abandoned.

[51] Int. Cl.$^5$ ............................................. F16J 15/34
[52] U.S. Cl. ...................................... 277/95; 277/96; 277/96.1; 277/9.5; 277/38
[58] Field of Search ............... 277/9, 9.5, 11, 38-43, 277/64, 65, 81 R, 95, 96, 96.1, 96.2

[56] References Cited

U.S. PATENT DOCUMENTS

| | | |
|---|---|---|
| 706,290 | 8/1902 | Zwart . |
| 1,470,587 | 10/1923 | Somes . |
| 1,582,305 | 4/1926 | Reichling . |

(List continued on next page.)

FOREIGN PATENT DOCUMENTS

| | | |
|---|---|---|
| 671238 | 9/1963 | Canada . |
| 133073 | 6/1984 | European Pat. Off. . |
| 118375 | 7/1983 | Japan . |
| 1023759 | 3/1966 | PCT Int'l Appl. . |
| 8804379 | 6/1988 | PCT Int'l Appl. . |
| 1195100 | 9/1984 | U.S.S.R. . |
| 28433 | 12/1903 | United Kingdom . |
| 8470 | 4/1914 | United Kingdom . |

OTHER PUBLICATIONS

Dahlheimer: "Mechanical Face Seal Handbook"; publ. by Chilton Book Co., Aug. 1975, pp. 76-77.

(List continued on next page.)

*Primary Examiner*—William A. Cuchlinski, Jr.
*Assistant Examiner*—Scott W. Cummings
*Attorney, Agent, or Firm*—Oblon, Spivak, McClelland, Maier & Neustadt

[57] ABSTRACT

A seal for preventing leakage around a rotary shaft extending through a structural casing comprising an annular stationary rigid seal secured to the structural casing for surrounding the rotary shaft. The stationary rigid seal has a smooth sealing surface for establishing a seal, and a resilient rotary seal adapted to be secured to the rotary shaft and having an annular projecting edge for contacting the smooth sealing surface under a biased pressure to form a seal in conjunction therewith. The projecting edge is formed by the convergence of inner and outer forward surfaces. A radial surface extends to the inner concentric forward surface from a torque point at its forward cylindrical base. An outer rearward surface extends to the outer concentric forward surface from a pivot point at its rearward cylindrical base. The outer forward surface forms an angle with the central axis of the seal in a plane through the central axis of the seal of from 40° to 60°. The inner concentric forward surface and the outer rearward surface forms angles with the central axis of the seal in a plane through the central axis of the seal which are individually within the range of from 45° to 60°. A line extending in a plane through the central axis of the seal from the pivot point to the projecting edge is within the range of from 16° to 21°.

10 Claims, 3 Drawing Sheets

U.S. PATENT DOCUMENTS

| | | |
|---|---|---|
| 2,077,954 | 4/1937 | Ramclow . |
| 2,863,680 | 12/1958 | Taltavall, Jr. . |
| 3,015,505 | 1/1962 | Smith . |
| 3,072,414 | 1/1963 | Porges et al. . |
| 3,112,113 | 11/1963 | Taylor . |
| 3,223,425 | 12/1965 | Leman . |
| 3,615,097 | 10/1971 | Malmstrom . |
| 3,655,205 | 4/1972 | Petersen . |
| 3,655,206 | 4/1972 | Adams . |
| 3,705,728 | 12/1972 | Millar . |
| 3,807,742 | 4/1974 | Hershey . |
| 3,926,443 | 12/1975 | Fenerty et al. ............ 277/96 |
| 4,099,765 | 7/1978 | Bright . |
| 4,136,887 | 1/1979 | Wentworth, Jr. . |
| 4,205,858 | 6/1980 | Shimazaki et al. . |
| 4,212,475 | 7/1980 | Sedy . |
| 4,230,324 | 10/1980 | Derman . |
| 4,295,654 | 10/1981 | Kawamura et al. . |
| 4,311,315 | 1/1982 | Kronenberg . |
| 4,364,571 | 12/1982 | Hershey . |
| 4,413,830 | 11/1983 | Pietsch . |
| 4,465,285 | 8/1984 | Toyoda et al. . |
| 4,469,336 | 9/1984 | Linne . |
| 4,538,820 | 9/1985 | Duffee ...................... 277/11 |
| 4,580,790 | 4/1986 | Doose . |
| 4,643,439 | 2/1987 | Lewis et al. ............... 277/95 |
| 4,691,927 | 9/1987 | Sudol et al. ............ 277/81 R X |
| 4,819,999 | 4/1989 | Livesay et al. . |
| 4,872,689 | 10/1989 | Drumm ..................... 277/9.5 |
| 4,962,136 | 10/1990 | Peters . |
| 4,973,063 | 11/1990 | Korenblit . |
| 4,989,882 | 2/1991 | Warner et al. . |
| 4,989,883 | 2/1991 | Orlowski . |
| 4,991,857 | 2/1991 | Pippert . |
| 4,995,620 | 2/1991 | Zawaski et al. . |
| 4,997,191 | 3/1991 | Warner . |
| 4,997,192 | 3/1991 | Nagai et al. . |
| 5,018,749 | 5/1991 | Forch . |
| 5,049,347 | 9/1991 | Magill et al. . |
| 5,066,026 | 11/1991 | Heck et al. . |
| 5,123,660 | 6/1992 | Dahlheimer et al. . |

OTHER PUBLICATIONS

C. R. Seals Handbook, catalog #457010, Jan. 1986, pp. 3, 4, 10, and 25.

Dennis Hull: "Recent Developments Expand Aflas Elastomer Performance", Xenox Inc., 6 pgs., date unknown.

"Effects of Strain Induced Crystallization . . . "; Polymer Engineering and Science, vol. 27, No. 15, Aug. 1987, (pp. 1203-1208).

Hsu, Y. H., *Polymer Engineering and Science,* 27:1203-1208 (1987).

Mayer, E., Mechanical Seals, 2nd ed., American Elsevier: New York, pp. 10-11 (1975).

Mechanical Seal Designs & Types, Fluid Sealing Association, pp. 8-10; (Date Unknown).

Roberts, A. D., *Tribology International,* 10:115-122 (1977).

Roberts, A. D., *Tribology International,* 10:175-183 (1977).

Stevens, C. A., "*Strain Effects Upon The Degradation of Fluorelastomers*", NTIS No. pp. P888-170054, Report No. RD/M-1767/RR88; AGR/CIF/TWG/P(88)/710 (1988).

RESILIENT ROTARY SEAL WITH PROJECTING EDGE

RELATIONSHIP TO COPENDING APPLICATIONS

This application is a continuation-in-part of copending applications Ser. No. 07/973,108 filed Nov. 6, 1992, pending Ser. No. 07/875,889 filed Apr. 29, 1992(abandoned), Ser. No. 07/868,080 filed Apr. 13, 1992(abandoned), Ser. No. 07/735,920 filed Jul. 25, 1991 (abandoned) and Ser. No. 07/738,007 filed Jul. 30, 1991(abandoned), the latter two of which, in turn, are continuations-in-part of application Ser. No. 07/595,420 filed Oct. 11, 1990, now abandoned. The entire contents of all of the above applications are hereby incorporated by reference.

FIELD OF THE INVENTION

This invention relates to sealing devices for rotating shafts and more particularly to seals located between a rotating shaft and a housing of a pump, pressure vessel or the like in which fluid is contained under pressure. Such fluids may include liquids, gases, or slurries including fluids containing corrosive chemicals.

BACKGROUND OF THE INVENTION

In industries with manufacturing processes involving fluids, numerous pumps and other rotary shaft devices are required for the transport and handling of fluids such as slurries and chemical solutions. The flushing water requirements of these seals for seal lubrication and radical or fugitive emission suppression greatly increased operational water requirements and increased the volumes of liquid wastes requiring treatment to remove environmental pollutants.

Our rotary seals are developed to solve these problems. These seals are believed to rely on mixed boundary asperity lubrication between a resilient seal member and a hard smooth surface of an opposed sealing member, the pressure at the contact surface between these two members being sufficient to minimize flow of liquid between their sealing faces. The normally high friction between such elastomeric materials and hard surfaces would appear to so severely limit the useful life of such seals that they would not be practical. One would expect that a significant flow of liquid lubricants would be required to reduce this friction.

We found that if the contact area of the resilient member was minimized, the resilient materials at the contact area were stress hardened, the polymeric components were aligned in a direction parallel to the hard sealing surface, and heat transfer elements were provided to remove heat from the sealing contact surfaces, the life of such seals was greatly extended and satisfy industrial requirements, without conventional thin film liquid lubrication. These "dry faced" seals required negligible flow of product for lubrication, unlike conventional mechanical seals. The liquid product in the stuffing box has a primary function of removing heat. Remaining heat is removed by conduction through the stationary sealing member.

OBJECTS AND SUMMARY OF THE INVENTION

It is a principal object of this invention to provide a modification of the shape of the resilient rotary sealing component which provides a more continuous pressure at the sealing surfaces.

It is another object of this invention to provide a dry face seal with a long operational life without requiring flushing liquid lubrication during operation, and which can be used with rotary pumps and other devices operating with all types of liquids and suspensions.

It is a further object of this invention to provide a dry face seal which reduces the volume of water used in manufacturing facilities and released therefrom into the environment, and which can be used with liquids containing or producing gaseous components without releasing hazardous amounts of the gaseous components into the environment.

It is a still further object of this invention to provide liquid between tandem rotary seals according to this invention, the liquid providing the functions of removing heat from the seals, seal lubrication, and a further barrier to escape of gaseous components.

In summary, the rotary seal combination of this invention for preventing leakage around a rotary shaft extending through a structural casing comprises an annular stationary rigid seal secured to the structural casing for surrounding the rotary shaft. The stationary rigid seal has a smooth sealing surface for establishing a seal, and a resilient rotary seal adapted to be secured to the rotary shaft and having an annular projecting edge means for contacting the smooth sealing surface under a biased pressure to form a seal in conjunction therewith. The projecting edge means is formed by the convergence of inner and outer forward surfaces. A radial surface extends to the inner forward surface from a torque point at its forward cylindrical base. An outer rearward surface extends to the outer forward surface from a pivot point at its rearward cylindrical base.

The outer forward surface forms an angle, E, with the central axis of the seal in a plane through the central axis of the seal of from 40° to 60°. The inner concentric forward surface and the outer rearward surface forms angles with the central axis of the seal in a plane through the central axis of the seal which are individually within the range of from 45° to 60°. A line extending in a plane through the central axis of the seal from the pivot point to the projecting edge means, G, is within the range of from 16° to 21°.

Preferably, the resilient rotary seal comprises a carbon filled thermally resistant polymer composition having a durometer hardness of at least 85.

Optimally, the radial distance in a plane perpendicular to the axis of the rotary seal from the projecting edge means and a line parallel to the axis of the rotary seal through the torque point, D, is determined by the formula:

$$D = \lambda\gamma + \delta ID$$

wherein
$\gamma$ is from 1.7 to 2.5,
$\delta$ is from 0.014 to 0.021, and
ID is the inner diameter of the proximal sealing edge, in millimeters.

Optimally, the distance in a plane perpendicular to the axis of the rotary seal of a line perpendicular to the outer rearward surface extending therefrom to the torque point, T, is determined by the formula:

$$T = \alpha + \beta ID$$

wherein

α is from 3.2 to 3.6,

β is from 0 to 0.040, and

ID is the inner diameter of the proximal sealing edge, in millimeters.

The resilient rotary seal is also an aspect of this invention.

DETAILED DESCRIPTION OF THE INVENTION

The devices of this invention are suitable for use with rotary shaft devices used in process and mining industries. For purposes of example and not by way of limitation, the invention is described hereinafter using an embodiment which is particularly adapted for use with slurry pumps. The same basic configurations can be used for other pumps used in chemical manufacturing, and other industries requiring pumping of suspensions and chemical process solutions.

The term "breaking elongation", as used herein, is defined as the percentage of stretch under tension of an elastomer from its relaxed condition to its breaking point.

Seals known prior to our inventions require a constant and substantial flow of liquid between sealing surfaces. The seals of this invention comprises a flat, annular smooth rigid surface and an opposed annular resilient projection which forms a seal therewith. One of the sealing components rotates, and the other is stationary. In the seals of this invention, negligible flow of lubricating and cooling liquid takes place from one side, through and between, to the other side of the sealing surfaces during normal operation of the seal. Hence, the seals of this invention are described as "dry face seals". The term "dry face seal", as used herein, is defined to denote seals which are characterized by the absence of any significant flow of liquid through the seal during normal operation, and little, if any, of liquid from one side of the seal is detectable on the other side. Since the seals of this invention are in constant contact with liquid, however, minute amounts of liquid may be present between the sealing surfaces, and this liquid, if present, may be involved in an asperity lubrication or elastohydrodynamic lubrication of the seals. The invention and the term "dry face seal" is intended to include seals of the structure described herein whether or not liquid is present between the sealing surfaces during normal operation.

Figure 1:
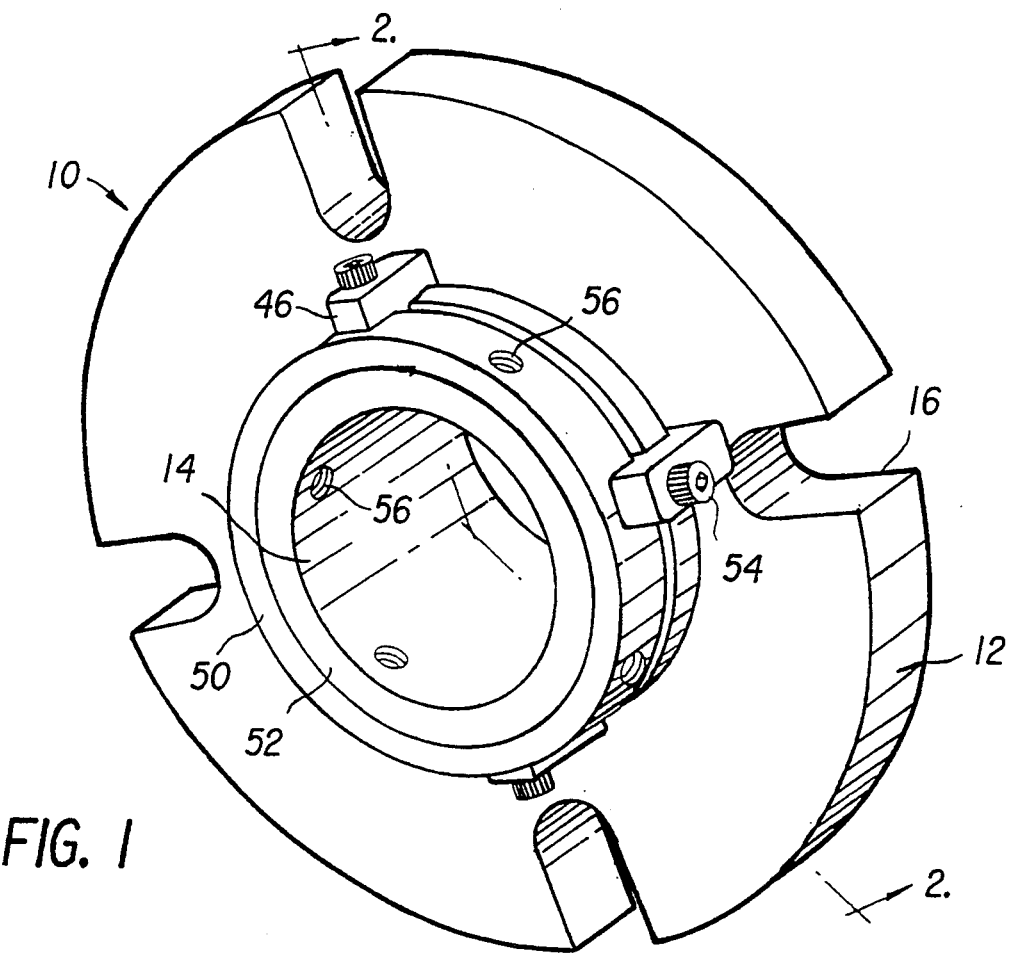
FIG. 1 is a prospective view of a sealing device embodying the principles of the present invention, shown assembled and ready for installation.
Figure 2:
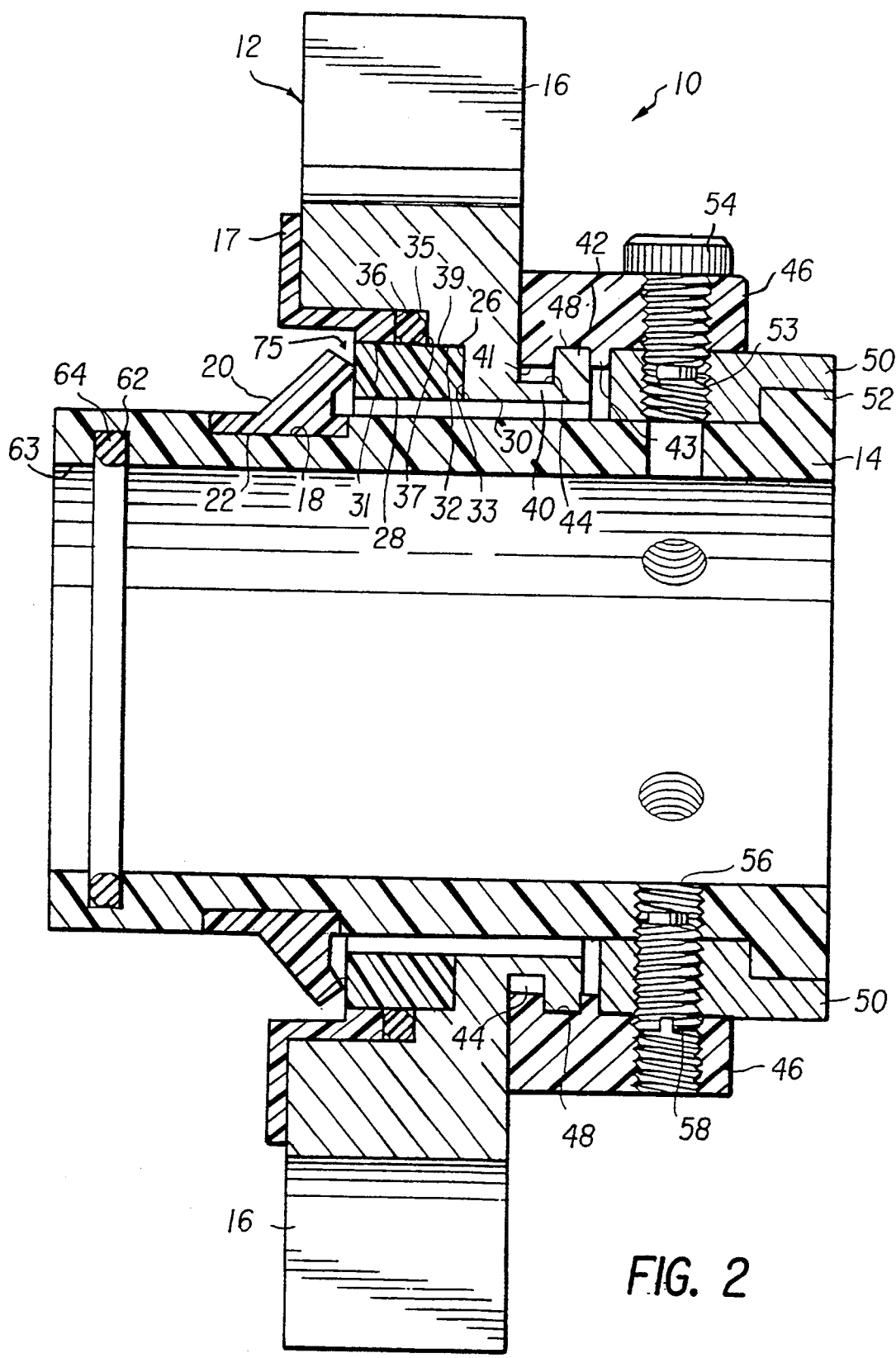
FIG. 2 is a view in elevation and in section taken along the line 2—2 in FIG. 1.

Referring to FIGS. 1–2 of the drawings, FIG. 1 is a prospective view of a sealing device embodying the principles of the present invention, shown assembled and ready for installation. FIG. 2 is a view in elevation and in section taken along the line 2—2 in FIG. 1.

In general, the rotary seal device 10 comprises an annular plate-like housing or gland 12 through which extends a sleeve 14 that is adapted to be mounted, fixed to a pump shaft which is rotatable about it axis. The annular housing 12 is attached to a wall in a pump housing, stuffing box or a similar structure by means of bolts which may extend through holes or slots 16 in an area near the periphery of the housing. A gasket 17 is provided to seal the plate-like housing 12 against leakage.

Sleeve 14 can be made of any material which provides the requisite physical properties and chemical resistance, has a high operating temperature rating and is easily machined to close tolerance. An example of a suitable material having these properties is polytetrafluoroethylene (PTFE).

Referring to FIG. 2, the sleeve 14 has a groove 18 which accommodates and retains an annular rotary seal member 20 ("rotary seal") having a base 22 which seats in the groove 18.

The rotary seal has a proximal edge 75 which abuts an annular stationary ring seal member or seat 26. This stationary ring seal 26 is mounted and retained in an annular receptor defined by a cylindrical surface 32 and an annular backing surface 33 of the housing 12.

The stationary seal 26 has a rectangular cross-section. It has an inner cylindrical surface 28 having substantially the same radius as the adjacent cylindrical surface 30 of the housing 12. It has an outer surface which is dimensioned to abut the inner flange surfaces 31 and housing surfaces 32 and 33. O-ring 36 is positioned in an annular recess defined by the gasket 17 and annular surfaces 35 and 37 of the housing 12. The O-ring 36 is pressed against the outer surface 39 of the stationary ring seal and housing surfaces 35 and 37, preventing passage of liquid between the ring seal 26 and the housing 12.

The stationary seal 26 is made of a corrosion resistant, hard material which will maintain a smooth surface in continued use. A preferred stationary seal material is silicon carbide.

An annular end portion 40 of the housing 12 has an outer radial flange 42 with an inner diameter which is the same as that for the stationary seal 26. The outer flange 42 and opposing wall of housing gland 12 defines a groove 44 in the housing gland for receiving one end of a series of clip spacers 46. The clip spacers are preferably made of a hard relatively rigid plastic material such as nylon. As described hereinafter, the spacers 46 are used to maintain a pre-load on the rotary seal 20. They are located at four or six circumferentially spaced apart locations on the sealing device 10 as shown in FIG. 1. Each clip spacer 46 has a transverse groove 48 for receiving the outer radial flange 42 and a pair of opposed ridge members 41 and 43 defining the groove. The spacers 46 are attached to and extend over a sleeve collar 50. The sleeve collar 50 is preferably made of a metal material such as stainless steel and fits around an end flange 52 of the sleeve 14. A series of threaded holes 53 are provided at 90° spaced apart locations on the sleeve collar and each preload spacer clip 46 is retained thereto by a cap screw 54. Between the cap screws are a second series of threaded holes 56 which extend radially inwardly to the outer surface of the sleeve 14. Set screws 58 within the holes 56 are advanced after the sealing device 10 is installed to secure the sleeve to a pump shaft 60 as shown in FIG. 2.

In the distal end of the internal wall of sleeve 14, groove 62 is provided for retaining an O-ring 64. This O-ring provides a fluid seal between the sleeve 14 and the shaft 60 when inserted therethrough. The groove 62 is spaced back from the inner end of the sleeve 14 by at least 0.10 in. so that the hydraulic force of the liquid within the casing in a typical installation will not spread the front edge of the sleeve 63 and allow leakage along the pump shaft.

The rotary seal 20 is an important element of the sealing device 10 because it provides for effective sealing between it and the stationary seal 26 for long periods of relative movement between these two elements.

Figure 3:
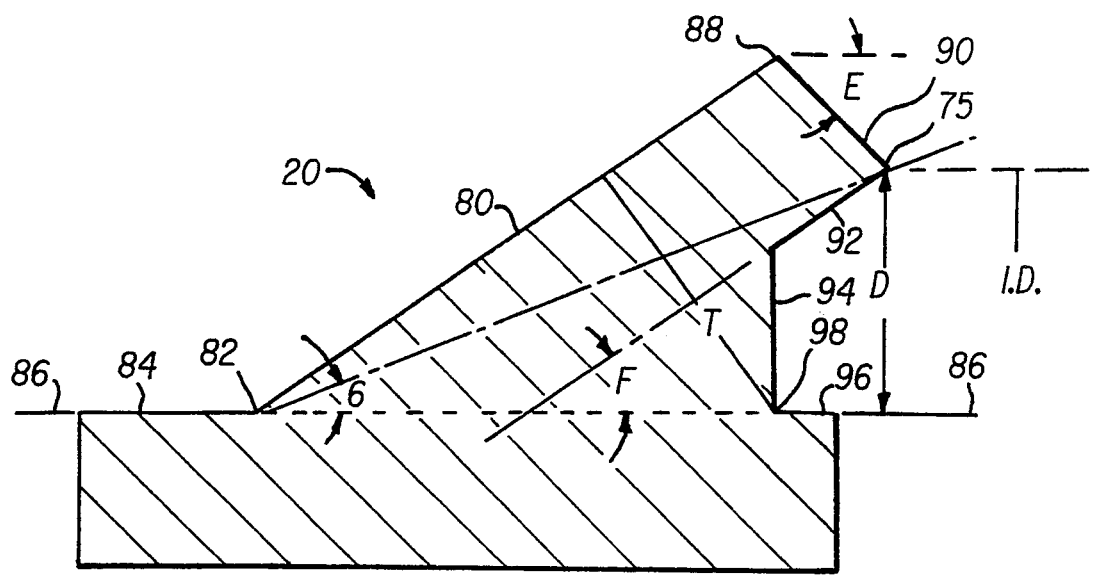
FIG. 3 is a fragmentary cross-section of a rotary seal of this invention.

FIG. 3 is a fragmentary cross-sectional view of the rotary sealing element 20. The physical properties, configuration and angular dimensions of the rotary seal are important aspects of this invention, cooperating to provide optimum operation and durability of the seals. In FIG. 3, the annular rotary seal 20 has a back surface 80 exposed to a pump chamber. Outer rearward surface 80 extends from footing corner or pivot point 82 to the outer seal edge 88, pivot point 82 being the intersection of surface 80 with cylindrical surface 84. Cylindrical surface 84 is flush with the sleeve surface 86. The seal's forward surface comprises outer forward surface 90, forming an Angle E with a line parallel to the central axis of the rotary seal, and sloping from the outer edge 88 to the forward edge 75. The forward surface of the rotary seal also includes an inner forward surface 92 which extends backward from the forward protruding edge 75, preferably approximately parallel to surface 80, to the surface 94. Surfaces 90 and 92 converge to form annular projection 15. Forward surface 94 falls in a plane perpendicular to the central axis of the seal and extends to surface 96, a cylindrical surface which is flush with the sleeve surface 86. The torque corner 98 is the intersection of the surfaces 94 and 96. The surface 92, in a plane through the central axis of the seal, defines a slope which forms an Angle F with a projection of surface 96. A line from the protruding edge 75 to the opposite footing corner 82 of the seal forms an Angle G with a line parallel to the central axis of the seal.

The thickness T, in millimeters, is the length of a straight line normal to surface 80 to torque corner 98 in a plane through the central axis of the seal. The optimum thickness T can be determined by the following formula wherein I.D. is the inner diameter of annular projection 75 in millimeters:

$$T = \alpha + \beta I.D.$$

The distance D is the length, in millimeters, of a straight line normal to the central axis of the seal from protruding edge 75 to the surface of axially concentric cylindrical extension of the surface 96 through torque point 98 in a plane through the seal central axis. The optimum distance D can be determined by the following formula wherein I.D. is as defined above:

$$D = \gamma + \delta ID$$

Preferred values for the angles E, F and G, and the variables $\alpha$, $\beta$, $\gamma$ and 67 are shown in the following table. Values for an optimum example for D, T, and the angles E, F, and G are also shown.

TABLE

| Variable | Range | Optimum Example |
|---|---|---|
| I.D. | | 66.4 mm |
| D | | 3.05 mm |
| E | 40°–60° | 60° |
| F | 45°–60° | 45° |
| G | 16°–21° | 18.4° |
| T | | 3.97 mm |
| α | 3.0–3.6 | |
| β | 0–0.04 | |
| γ | 1.7–2.5 | |

TABLE-continued

| Variable | Range | Optimum Example |
|---|---|---|
| δ | 0.014–0.021 | |

The rotary seal 20 comprises an elastomeric polymer having the chemical and thermal resistance and the mechanical properties required for the environment to which it is exposed in use. The seal should have a breaking elongation of at least 100 percent and up to 150 percent. For most industrial applications for pumping slurries and aqueous suspensions, the breaking elongation should be from about 100 up to about 150 percent. The durometer hardness of the seal composition should be from about 85 to about 95 and preferably from about 90 up to about 95.

The composition of the elastomeric polymer component is selected to provide resistance to thermal degradation and an optimum service in the particular environment to which the seal will be exposed. One suitable elastomeric polymer is AFLAS (Asahi Glass Co, Inc.), a peroxide cured copolymer of tetrafluoroethylene and propylene. Other suitable elastomeric polymers include FKM-Tetrapolymer and base resistant FKM polymers (Macrotech/CDI, Humble, Tex.). The durometer hardness of the polymeric composition can be adjusted by intermixing the polymer with a requisite quantity of a finely divided carbon filler such as Austin Black.

A critical aspect of the elastomeric seal is the extent it is stretched in the direction parallel to the seal surface of the opposed stationary, rigid seal. The stretching should be sufficient to substantially reduce the coefficient of friction between the sealing surfaces. The stretching stress hardens the projecting edge of the resilient seal, aligns the polymeric components of the seal in a direction parallel to the seal surface and reduces irregularities in the sealing surface of the seal, thereby reducing the coefficient of friction between the sealing surfaces. The preferred extent of stretching is at least 20 percent up to less than 40 percent of the breaking elongation of the seal material. Referring to FIG. 2, the resilient seal is maintained in the desired stretched condition by the selected inner diameter dimension of the seat 18. Stretching the annular seal in its circumferential direction produces a corresponding reduction in the width of the seal which must be adjusted by the width of the surface of the seat 18. The seal is positioned in this seat by stretching it, sliding it along the sleeve to its position in the seat 18 and relaxing the seal, permitting it to contract to fit securely in the seat 18.

Because the surfaces 90 and 92 converge to form the projecting edge 75, circumferential stretching of the resilient seal by increasing the seal diameter in the direction I.D. concentrates stress hardening at the edge 75, greatly reducing the coefficient of friction between the sealing surfaces 75 and 28.

A seal is established by the pressure of the leading edge 75 against the opposing face of the rigid sealing element 28. It is critical that this pressure be sufficient to effect a seal therebetween under operating conditions of the seal but which will not produce sufficient heat of friction to cause significant chemical changes in the projecting edge of the resilient seal. This is a critical adjustment, for excessive pressure will produce excessive friction, heat and sealing surface destruction. The pressure selected, however, should be sufficient to maintain the sealing engagement continuously during operation of the machinery being sealed.

The heat of friction unavoidable produced at the sealing surface is dissipated by the liquid being processed and the material of construction of the rigid seal 40 and the rigid seal housing 14. It is thus critical that the equipment be started with liquid in the pumping chamber to dissipate the initial heat generated in the seal face.

The radial width of the sealing surface produced by compression of the annular projection 75 by the opposing surface of element 28 is preferably the minimum radial with which is sufficient to maintain a seal. Excessive width and surface area of contact between the seals produces excessive heat, increasing the risk of seal destruction. The desirable sealing surface width for most applications should be less than 2 mm.

To those skilled in the art to which this invention relates, many changes in construction and widely differing embodiments and applications of the invention will make themselves know without departing from the spirit and scope of the invention. The disclosure and the description herein are purely illustrative and are not intended to be in any sense limiting.

We claim:

1. A seal for preventing leakage around a rotary shaft extending through a structural casing comprising an annular stationary rigid seal secured to the structural casing for surrounding the rotary shaft, the stationary rigid seal having a smooth sealing surface for establishing a seal, and a resilient rotary seal adapted to be secured to the rotary shaft and having an annular projecting edge means for contacting the smooth sealing surface under a biased pressure to form a seal in conjunction therewith, the projecting edge means being formed by the convergence of inner and outer forward surfaces of said resilient rotary seal, a radial surface of said resilient rotary seal extending to the inner forward surface from a torque point at its forward cylindrical base, an outer rearward surface of said resilient rotary seal extending to the outer forward surface from a pivot point at its rearward cylindrical base, the outer forward surface forming an angle, E, with a central axis of the seal in a plane through the central axis of the seal of from 40° to 60° the inner forward surface and the outer rearward surface forming angles with the central axis of the seal in a plane through the central axis of the seal which are individually within the range of from 45° to 60° and a line extending in a plane through the central axis of the seal from the pivot point to the projecting edge means, G, being within the range of from 16° to 21°.

2. A seal of claim 1 wherein the resilient rotary seal comprising a carbon filled thermally resistant polymer composition having a durometer hardness of at least 85.

3. A seal of claim 1 wherein the radial distance in a plane perpendicular to the axis of the rotary seal from the projecting edge means and a line parallel to the axis of the rotary seal through the torque point, D, is determined by the formula:

$$D = \gamma + \delta ID$$

wherein
 $\gamma$ is from 1.7 to 2.5,
 $\delta$ is from 0.014 to 0,021, and
 ID is the inner diameter of the proximal sealing edge, in millimeters.

4. A seal of claim 1 wherein the distance in a plane perpendicular to the axis of the rotary seal of a line perpendicular to the outer rearward surface extending therefrom to the torque point, T, is determined by the formula:

$$T = \alpha + \beta ID$$

wherein
 $\alpha$ is from 3.2 to 3.6,
 $\beta$ is from 0 to 0.040, and
 ID is the inner diameter of the proximal sealing edge, in millimeters.

5. A seal of claim 4 wherein the radial distance in a plane perpendicular to the axis of the rotary seal from the projecting edge means and a line parallel to the axis of the rotary seal through the torque point, D, is determined by the formula:

$$D = \gamma + \delta ID$$

wherein
 $\gamma$ is from 1.7 to 2.5,
 $\delta$ is from 0.014 to 0.021, and
 ID is the inner diameter of the proximal sealing edge, in millimeters.

6. A resilient rotary seal adapted to be secured to a rotary shaft and having an annular projecting edge means for contacting a smooth sealing surface under a biased pressure to form a seal in conjunction therewith, the projecting edge means being formed by the convergence of inner and outer forward surfaces of said resilient rotary seal, a radial surface of said resilient rotary seal extending to the inner forward surface from a torque point at its forward cylindrical base, an outer rearward surface of said resilient rotary seal extending to the outer forward surface from a pivot point at its rearward cylindrical base, the outer forward surface forming an angle, E, with a central axis of the seal in a plane through the central axis of the seal of from 40° to 60° the inner forward surface and the outer rearward surface forming angles with the central axis of the seal in a plane through the central axis of the seal which are individually within the range of from 45° to 60°, and a line extending in a plane through the central axis of the seal from a pivot point to the projecting edge means, G, being within the range of from 16° to 21°.

7. A resilient rotary seal of claim 6 wherein the resilient
 rotary seal comprising a carbon filled thermally resistant
 polymer composition having a durometer hardness of at least 85.

8. A resilient rotary seal of claim 6 wherein the radial distance in a plane perpendicular to the axis of the rotary seal from the projecting edge means and a line parallel to the axis of the rotary seal through the torque point, D, is determined by the formula:

$$D = \gamma + \delta ID$$

wherein
 $\delta$ is from 1.7 to 2.5,
 $\delta$ is from 0.014 to 0.021, and
 ID is the inner diameter of the proximal sealing edge, in millimeters.

9. A seal of claim 6 wherein the distance in a plane perpendicular to the axis of the rotary seal of a line perpendicular to the outer rearward surface extending therefrom to the torque point, T, is determined by the formula:

$$T = \alpha + \beta ID$$

wherein
- $\alpha$ is from 3.2 to 3.6,
- $\beta$ is from 0 to 0.040, and
- ID is the inner diameter of the proximal sealing edge, in millimeters.

10. A resilient rotary seal of claim 9 wherein the radial distance in a plane perpendicular to the axis of the rotary seal from the projecting edge means and a line parallel to the axis of the rotary seal through the torque point, D, is determined by the formula:

$$D = \gamma + \delta ID$$

wherein
- $\gamma$ is from 1.7 to 2.5,
- $\delta$ is from 0.014 to 0.021, and
- ID is the inner diameter of the proximal sealing edge, in millimeters.

* * * * *